(12) United States Patent
Huh (10) Patent No.: US 7,715,320 B2
(45) Date of Patent: May 11, 2010

(54) METHOD AND DEVICE FOR REQUESTING PERMISSION TO SEND MEDIA, AND METHOD AND DEVICE FOR CONTROLLING PUSH-TO SERVICE

(75) Inventor: Kang-Suk Huh, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 430 days.

(21) Appl. No.: 11/790,441

(22) Filed: Apr. 25, 2007

(65) Prior Publication Data

US 2007/0248040 A1 Oct. 25, 2007

Related U.S. Application Data

(60) Provisional application No. 60/794,532, filed on Apr. 25, 2006, provisional application No. 60/832,143, filed on Jul. 21, 2006.

(30) Foreign Application Priority Data

Feb. 20, 2007 (KR) ............... 10-2007-0017177

(51) Int. Cl.
*H04W 4/10* (2009.01)
(52) U.S. Cl. .................. 370/235; 455/518
(58) Field of Classification Search .......... None
See application file for complete search history.

(56) References Cited

U.S. PATENT DOCUMENTS 4,663,748 A * 5/1987 Karbowiak et al. ......... 370/224

2004/0224710 A1 11/2004 Koskelainen et al.

FOREIGN PATENT DOCUMENTS

| KR | 10-2004-0094275 A | 11/2004 |
| KR | 10-2005-0101506 A | 10/2005 |
| KR | 10-2005-0114565 A | 12/2005 |

OTHER PUBLICATIONS

Open Mobile Alliance: "POC User Plane - Candidate Version 1.0" - Jan. 27, 2006, XP002557420, Retrieved from the Internet: URL:http://www.openmobilealliance.org/Technical/release_program/docs/PoC/V1_0-200601pdf, [retrieved on Nov. 24, 2009], pp. 1-167.

(Continued)

*Primary Examiner*—Steven H Nguyen
*Assistant Examiner*—Alex Skripnikov
(74) *Attorney, Agent, or Firm*—Birch, Stewart, Kolasch & Birch, LLP (57) ABSTRACT

A method, PT client device and PT server device for controlling transmission of media data, are discussed. According to an embodiment, the method includes starting, by a PT server, a timer when a media burst revoke message is transmitted to a PT client; stopping, by the PT server, the timer before the timer expires when last media data and a media burst release message are received from the PT client; and transmitting, by the PT server, a media burst idle message to the PT client when the timer is stopped.

16 Claims, 6 Drawing Sheets

OTHER PUBLICATIONS

Kang Suk Huh, LG Electronics: "UP TB Idle after revoke" - Jul. 10, 2006, XP002557422, Retrieved from the Internet: URL:http://www.openmobilealliance.org/ftp/Public_documents/MWG/MWG-POCv2-2006-0550R01-CR_UP_TB_Idle_after_revoke.zip, [retrieved on Nov. 24, 2009], pp. 1-2.

Ericsson, Motorola, Nokia, Siemens: "Push-To-Talk Over Cellular (POC) User Plane; Transport Protocols; POC Release 1.0" - Aug. 1, 2003, XP000863836, Retrieved from the Internet: URL:http://www.openmobilealliance.org/Technical/release_program/docs/PoC/V1_0-200601pdf, [retrieved on Nov. 24, 2009], pp. 1-37.

Open Mobile Alliance: "POC User Plane - Draft Version 2.0" - May 22, 2006, XP002557423, Retrieved from the Internet: URL:http://www.openmobilealliance.org/ftp/Public_documents/MWG/MWG-POCv2/2006/OMA-POC-POCv2-2006-0550R01-CR_UP_TB_Idle_after_revoke.zip, [retrieved on Nov. 24, 2009], pp. 1-169.

\* cited by examiner

METHOD AND DEVICE FOR REQUESTING PERMISSION TO SEND MEDIA, AND METHOD AND DEVICE FOR CONTROLLING PUSH-TO SERVICE

The present application claims the priority benefits of U.S. Provisional Application No. 60/794,532 filed on Apr. 25, 2006 and No. 60/832,143 filed on Jul. 21, 2006 and Korean Patent Application No. 10-2007-0017177 filed on Feb. 20, 2007 in Republic of Korea. The entire contents of these applications are herein fully incorporated by reference.

BACKGROUND OF THE INVENTION

1. Field of the Invention

The present invention relates to a session-based service and, more particularly, to a method and device for providing a session-based PT service.

2. Description of the Related Art

In general, a SIP (Session Initiation Protocol) is commonly used as a protocol for controlling a session. The SIP refers to a signaling protocol that defines a procedure for terminals, which want communication, to establish a session therebetween, or delete or change the established session. The SIP uses an URL (Uniform Resource Locator) similar to an e-mail address in order to distinguish each user, so it can provide a service without being dependent on an IP (Internet Protocol) address.

The SIP-based session service may be, for example, a PT (Push-To) service. The PT service is a service for providing high speed communication to users, for example, between two users (one-to-one) or between receiver groups (one-to-many). The PT service generally includes a PTT (Push-To-Talk) service for audio data transmission, a PoC (Push-to-talk over Cellular) service allowing audio data to be transmitted over a cellular communication network, a PTV (Push To View) service for video data transmission, and a PTD (Push To Data) for data transmission.

Figure 1:
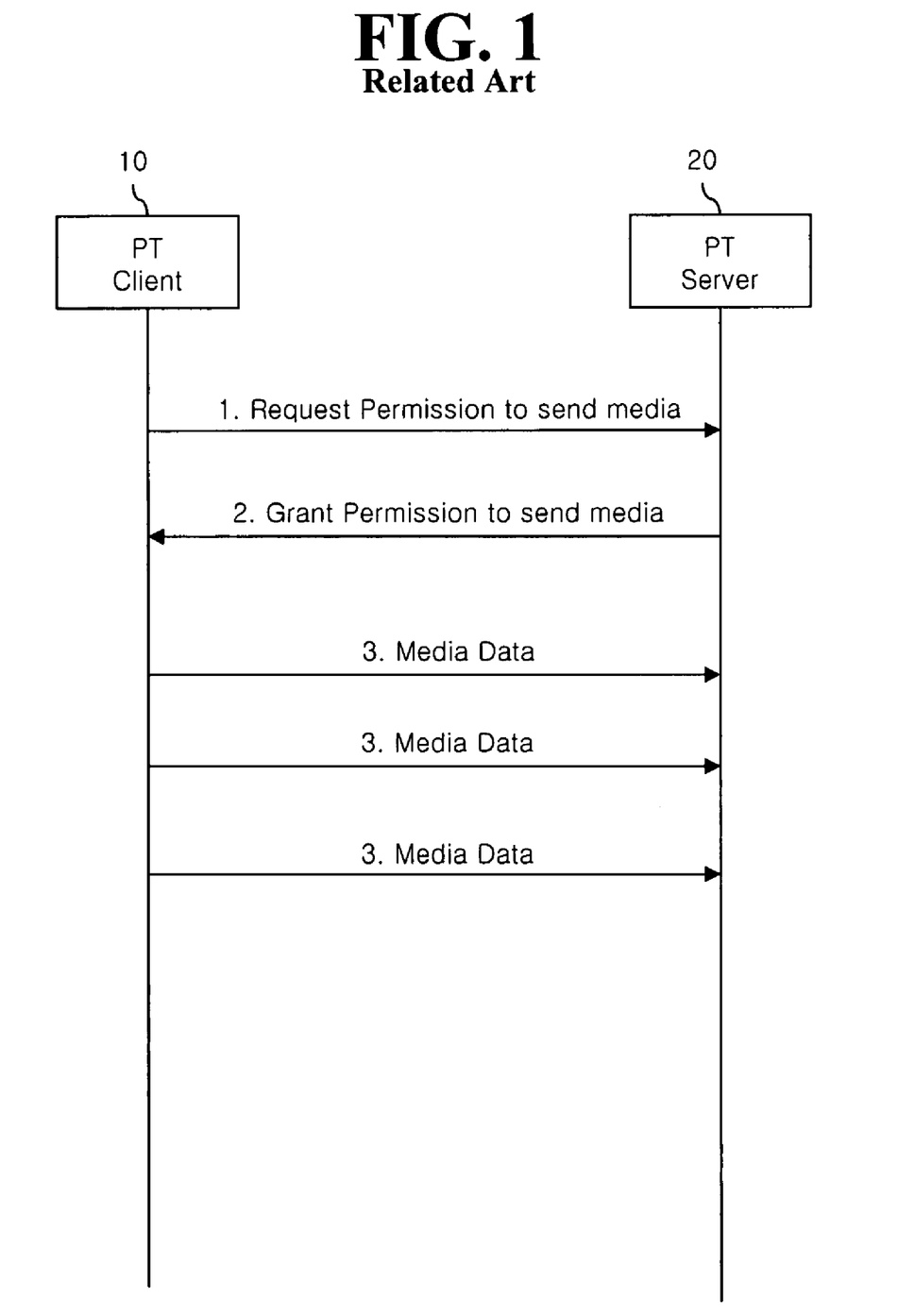
FIG. 1 is a view illustrating a process of requesting a permission to send media data in a PT service according to a related art.

FIG. 1 is an exemplary view showing a flow of a PT service according to a related art.

As shown in FIG. 1, in the PT service, a user cannot transmit voice, image, media data or other data until he/she requests a permission to send media (namely, authority to send) from a PT server and receives the permission from the PT server. This will be described in detail as follows referring to steps 1-3 shown in FIG. 1.

Step 1: A PT client 10 (e.g., a mobile phone) requests a permission to send media data to a PT server 20 capable of providing a PT service. This can be achieved, e.g., by transmitting a media burst request message from the PT client 10 to the PT server 20.

Step 2: The PT server 20 determines whether to give (or grant) the permission to send media in response to the request. In this case, when the PT server 20 has already given the permission to send media to another PT client, the PT server 20 refuses (or rejects) to give the permission to send media to the PT client 10. However, if the PT sever 20 determines that the permission to send media can be given to the PT client 10 which has requested it, the PT server 20 gives the permission to send media to the PT client 10, e.g., by transmitting a media burst granted message to the PT client 10.

Step 3: Upon receiving the permission to send media, the PT client 10 transmits media data.

However, the related art session-based PT service has a problem that when the PT client 10 transmits data for along time, other PT clients need to wait for the corresponding long time. This problem becomes serious when a user of the PT client intentionally (or maliciously) keeps transmitting data. Then, the other PT clients participating in the same session cannot be given the permission to send media although he/she has data to send. Other limitations associated with the related art will be discussed later referring to FIGS. 2 and 3.

SUMMARY OF THE INVENTION

Therefore, in order to address the above matters and other limitations associated with the related art, the various features described herein have been conceived. One aspect of the exemplary embodiments is to limit a PT client when the PT client transmits media data for longer than a first limit time.

Another aspect of the exemplary embodiments is to allow a PT client, who has been limited in transmitting media data because it had transmitted the media data by longer than the first limit time, to request a permission to send media again when the PT client has notified about stopping the transmission of data upon completing the transmission of data within a second limit time.

Still another aspect of the exemplary embodiments is to preferentially give a permission to send media to one of other PT clients when the other PT clients request it in a situation where a PT client has completed its media transmission within a second limit time and notified about stopping the transmission.

The present specification provides, in part, a method for requesting a permission to send media by a PT client, that may include: receiving an idle state message from a server before a non-permissive timer for sending media expires; stopping the non-permissive timer for sending media upon receiving the idle state message; and transmitting a message for requesting a permission to send media to the server when there is data to be transmitted.

This specification also provides, in part, a method for requesting a permission to send media by a PT client, that may include: transmitting one or more of final (last or remaining) data and a transmission stop message to a server before an additionally permissive timer for sending media, specified by the server, expires; receiving an idle state message from the server when other PT clients do not request a permission to send media from the server until the additionally permissive timer for sending media, specified by the server, expires; stopping a non-permissive timer for sending media when the idle state message is received before the non-permissive timer for sending media expires; and transmitting a message for requesting a permission to send media to the server when there is data to be transmitted.

This specification also provides, in part, a method for controlling a PT service by a PT server, that may include: receiving one or more of the final (remaining or last) data and a transmission stop message from a PT client before an additionally permissive timer for sending media expires; and stopping the additionally permissive timer, upon receiving the data or the message, and transmitting an idle state message to both the PT client and other PT clients participating in a session.

This specification also provides, in part, a method for controlling a PT service by a PT server, that may include: receiving one or more of the final (remaining or last) data and a transmission stop message from a PT client before an additionally permissive timer for sending media expires; transmitting an idle state message to one or more other PT clients participating in a session, except for the PT client, upon receiving the data or the message; and transmitting the idle state message to the PT client when a message for requesting a permission to send media is not received from one or more other PT clients until the additionally permissive timer for sending media expires.

According to another aspect, the present invention provides a method for controlling transmission of media data, comprising: starting, by a PT server, a timer when a media burst revoke message is transmitted to a PT client; stopping, by the PT server, the timer before the timer expires, when last media data and a media burst release message are received from the PT client; and transmitting, by the PT server, a media burst idle message to the PT client when the timer is stopped.

According to another aspect, the present invention provides a method for controlling transmission of media data, comprising: starting, by a PT client, a timer when a media burst revoke message including time information is received from a PT server; receiving, by the PT client, a media burst idle message from the PT server after the timer is started; and stopping, by the PT client, the timer before the timer expires, when the media burst idle message is received from the PT server.

According to another aspect, the present invention provides a PT client device comprising: a timer; and a controller to transmit media data when a PT server has given a permission to send media burst to the PT client device, to start the timer when a media burst revoke message including time information associated with an expiration of the timer is received from the PT server, and to stop the timer before the timer expires, when a media burst idle message is received from the PT server.

According to another aspect, the present invention provides a PT server device comprising: a timer; and a controller to receive media data from a PT client for a certain time duration after the controller has given a permission to send media burst to the PT client, to start the timer and send a media burst revoke message to the PT client after the certain time duration has elapsed, to receive last media data and a media burst release message from the PT client after the timer is started, and to stop the timer before the timer expires when the last media data and the media burst release message are received from the PT client. The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 4:
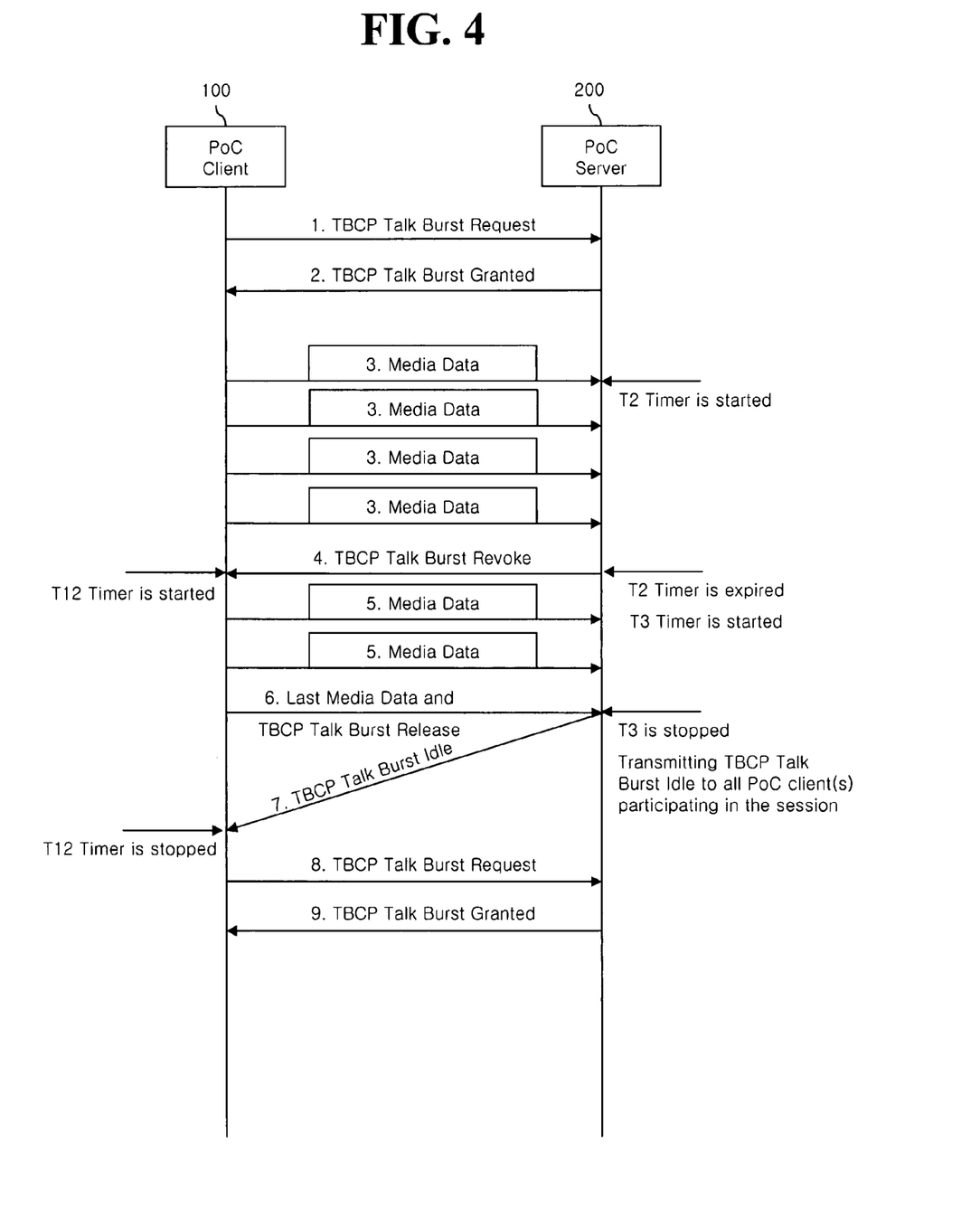
FIG. 4 is a view illustrating a method of controlling a transmission of media data in a PT service according to a first exemplary embodiment of the present invention.
Figure 5:
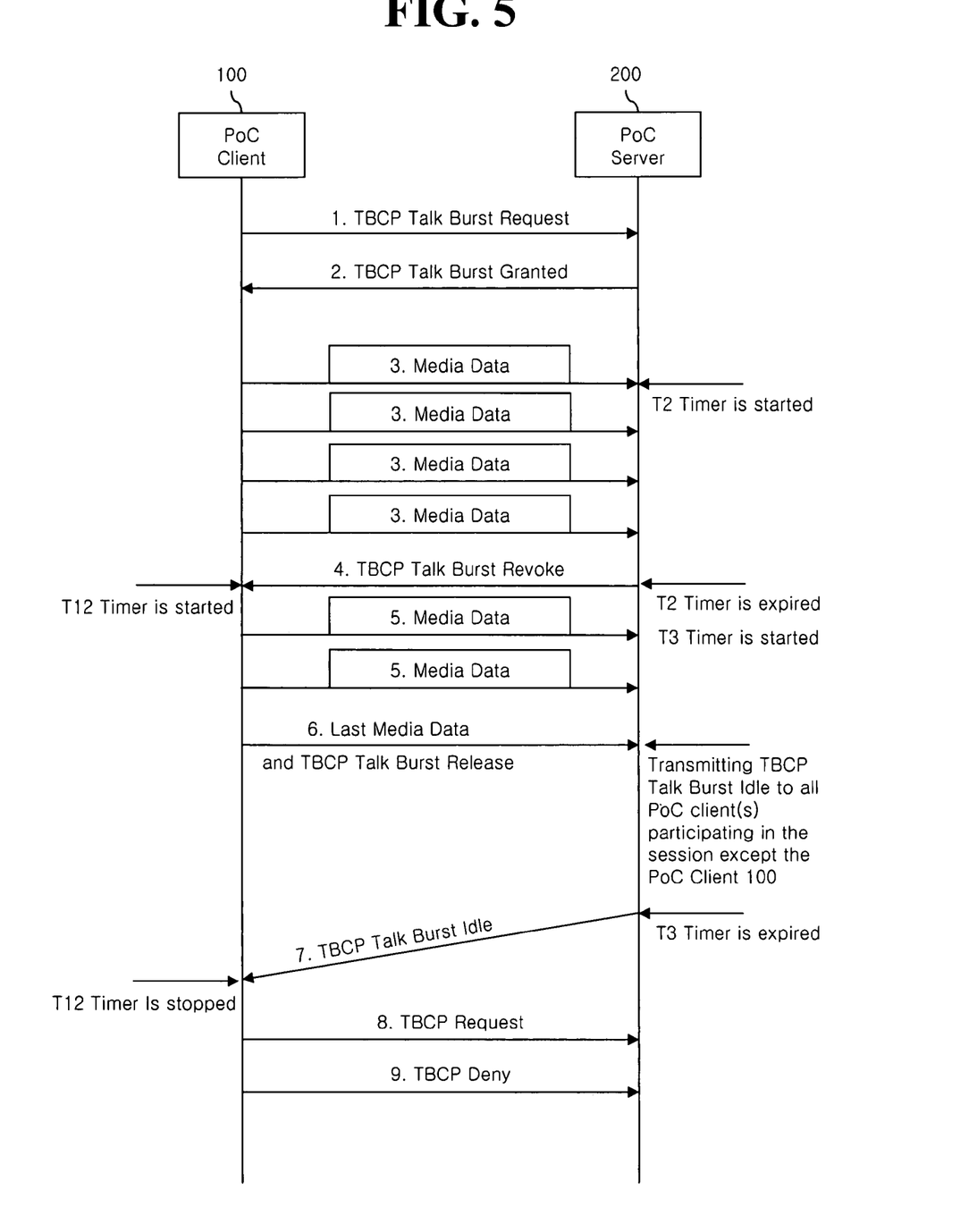
FIG. 5 is a view illustrating a method of controlling a transmission of media data in a PT service according to a second exemplary embodiment of the present invention.

Shown in FIGS. 4-5 are a PoC client and a PoC server only as examples, and the present invention is not limited thereto, but applies to a PT client and a PT server. Wherever the terms "PoC client" and "PoC server" are used, these represent an example of a "PT client" and a "PT server" and thus can be replaced with the "PT client" and "PT server", respectively. In this situation, any message communicated between the PT client and PT server would pertain to a media burst and will not be limited to a talk burst. The PoC client is not limited to a PoC service but can be applied for a PT service such as PT, PTV or PTD or other session-based services. The PoC client (or PT client) can be referred to as a terminal, a UE (User Equipment), an ME (Mobile Equipment), etc. Also, the PoC client (or PT client) can be a portable device such as a notebook computer, a mobile phone, a PDA, a smart phone or a multimedia device, etc., or can be a non-portable device such as a PC or a vehicle mounted device. Also, the PT client and the PT server communicate with each other using known protocols and techniques, e.g., via a network. Further, the sending or receiving of 'media' can be interchangeably used respectively with the sending or receiving of 'media data, and vice versa. For instance, the phrase 'permission to send media' can be interpreted to mean 'permission to send media data' and vice versa.

Various timers and their operations according to the related art will be first described to help understand the present invention. Each of these timers has a preset time (value) for which the timer is intended to run, and expires when the preset time has elapsed.

1) 'T2' timer: Permissive timer for sending media data (first limit time)

The T2 timer is operated by the PoC server with respect to the PoC client. It is also called a stop talking timer and refers to a valid time during which the PoC client can transmit media data. The T2 timer is started (or initiated) when initial data is received from the PoC client. When the final data is received from the PoC client before the T2 timer expires, the T2 timer is stopped. If, however, the PoC server does not receive the final data from the PoC client until the T2 timer expires, a T3 timer is started (or initiated).

2) 'T3' timer: Additionally permissive timer for sending media data (second limit time)

The T3 timer is operated by the PoC server with respect to the PoC client. It is also called a stop talking grace timer and refers to an additionally permitted time during which the PoC server can receive remaining media data from the PoC client after a media transmission cancel message (TB revoke) is sent to the PoC client (after the T2 timer expires). The T3 timer is started (or initiated) when the T2 timer expires. Then when the PoC server receives a transmission stop message together with the final data from the PoC client, the T3 timer is stopped. If the PoC server does not receive yet the transmission stop message with the final media data from the PoC client until the T3 timer expires, a T9 timer is started.

3) 'T9' timer: Non-permissive timer for sending media data

The T9 timer is designated by the PoC server with respect to the PoC client. It is also called a retry-after timer, during which any media data received from the PoC client is disregarded or discarded (and not transmitted to the other PoC client(s)) by the PoC server although the PoC server receives the media data from the PoC client or receives a request of the permission to send. The T9 timer is started when the T3 timer expires.

4) 'T12' timer: non-allowable timer for requesting permission to send media data.

The T12 timer is operated by the PoC client. It is also called a PoC client retry-after timer, during which the PoC client cannot request a permission to send media from the PoC server. The T12 timer is started (or initiated) when the PoC client receives a message for withdrawing the permission to send media (i.e., media data) from the PoC server. When the T12 timer expires, the PoC client can request a permission to send media data to the PoC server.

Figure 2:
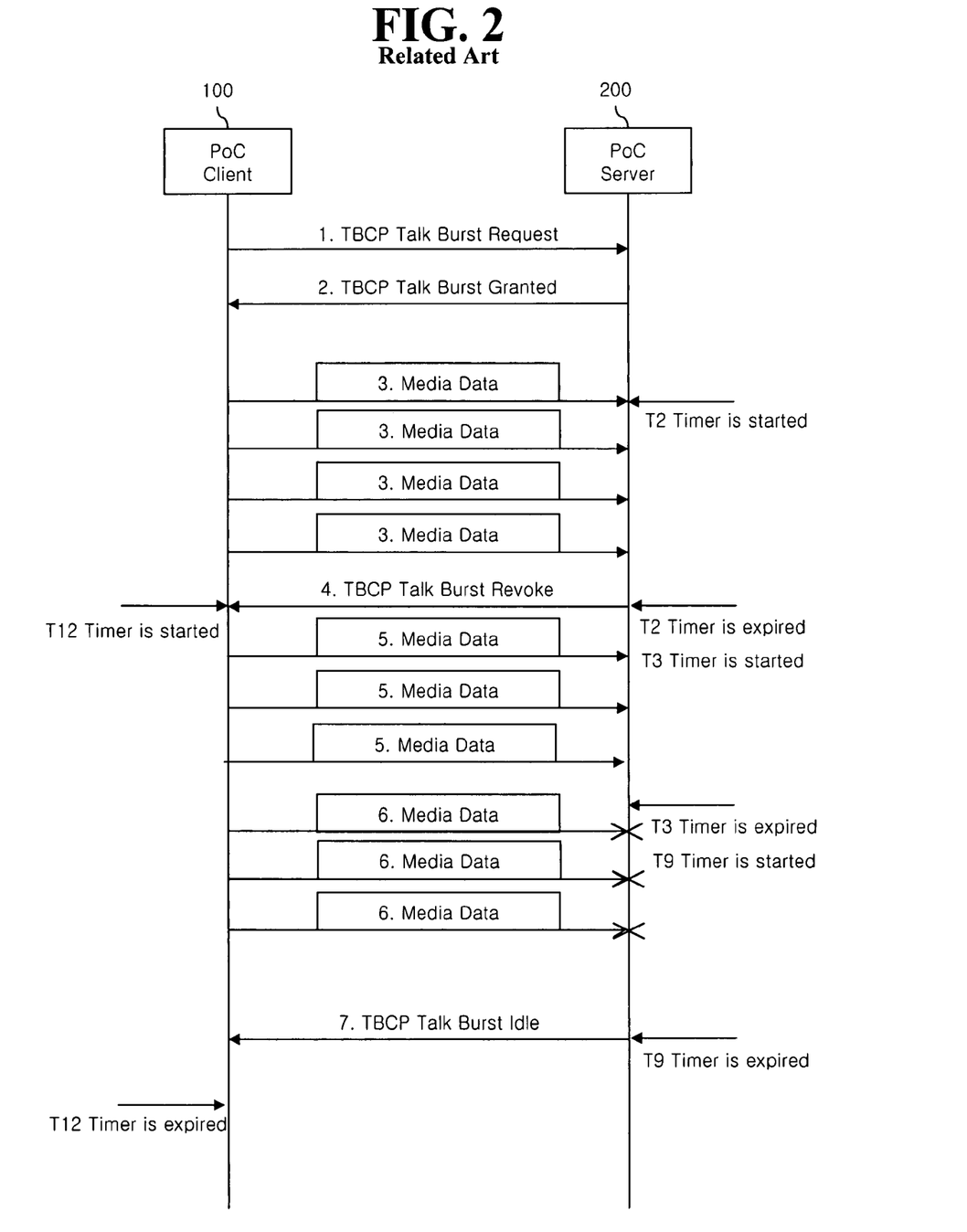
FIG. 2 is a view illustrating one scenario in a method of controlling a transmission of media data in a PT service according to a related art.
Figure 3:
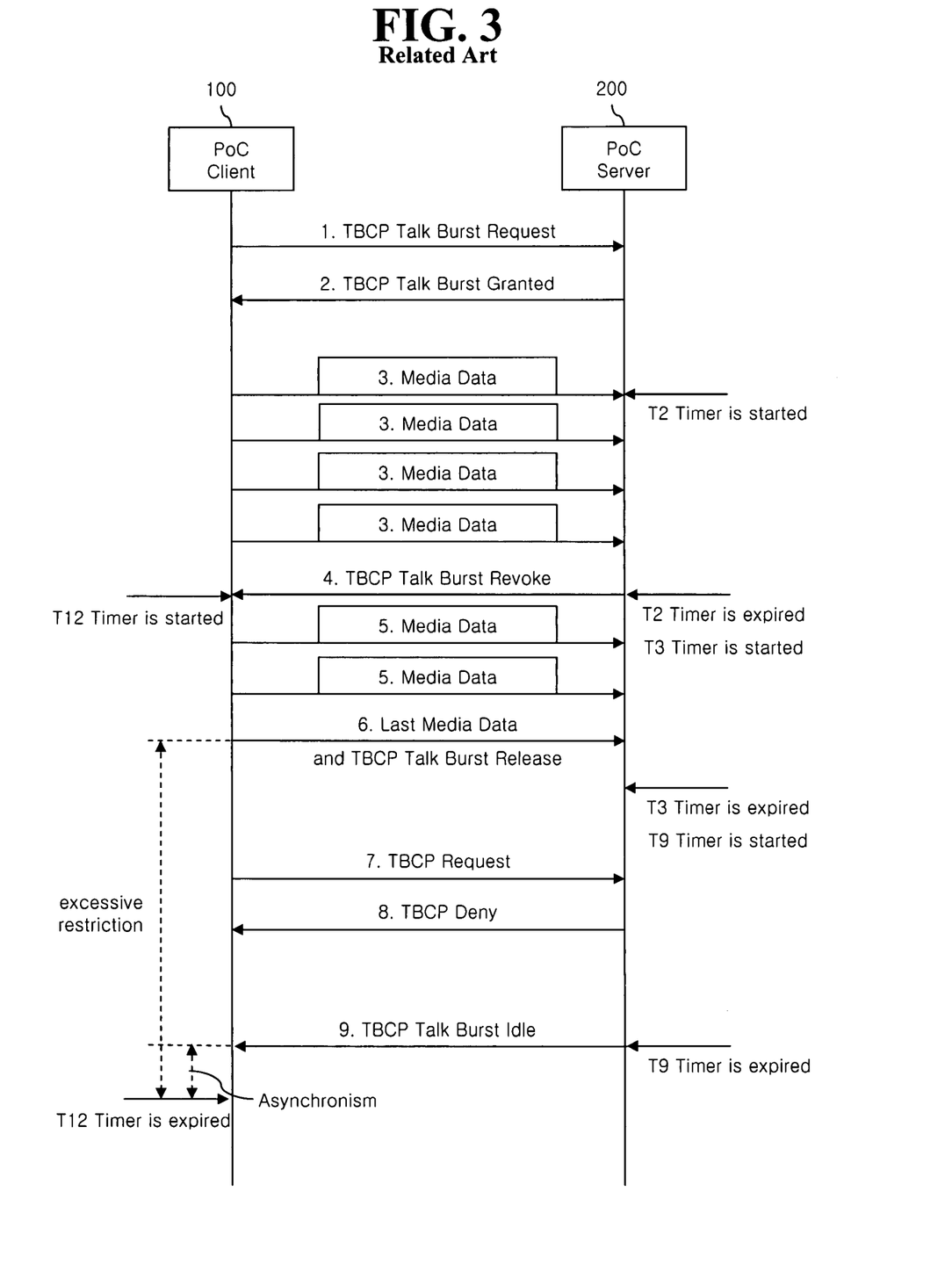
FIG. 3 is a view illustrating another scenario in a method of controlling a transmission of media data in a PT service according to a related art.

FIGS. 2 and 3 are views illustrating one scenario in a method of controlling a transmission of media data in a PT service according to a related art. Now, these figures will be first described below to help understand the preferred embodiments of the present invention.

As shown in FIG. 2, in the method according to the related art, even after the permissive timer to send media (first limit time), namely, the T2 timer, expires, a transmission of data by a PT client is limited. Steps 1-3 in FIG. 2 are the same as steps 1-3 of FIG. 1 Generally referring to FIG. 2, when the PoC server 200 does not receive the final (remaining or last) media data from the PoC client 100 until after the permissive timer for sending media (T2 timer) expires, it is operated as follows. First, the PoC server 200 starts (initiates) the additionally permissive timer for sending media (T3 timer), and notifies the PoC client 100 about the withdrawal (or revocation) of the permission for sending media data. Second, the PoC client 100 starts the non-allowable timer for requesting permission to send media data (T12 timer) in response to the withdrawal (or revocation) of the permission to send media data. Accordingly, the PoC client 100 is limited such that it cannot request a permission to send media data until after the T12 timer expires. Third, the PoC server 200 disregards or discards any media data received after the T3 timer expires. That is, once the T3 timer expires, the timer T9 starts to run and during the running of the T9 timer, the PoC server 200 does not transmit any media data received from the PoC client 100 to other client(s) in session with the PoC client 100.

The method of FIG. 2 will now be described in more detail. Steps 1-3 in FIG. 2 are the same as steps 1-3 in FIG. 1.

Step 1: The PoC client 100, who wants to send media data to one or more other PoC clients in session, requests a permission to send media data (or talk burst) to the PoC server 200. In this case, the requesting for the permission to send media data can be achieved by transmitting a message for requesting a permission to send media data such as, for example, a request message or a SIP-based TBCP talk burst request message.

Step 2: Then, the PoC server 200 notifies the PoC client 100 that the permission to send media data has been given (or granted) to the PoC client 100. In this case, this notification can be achieved by transmitting a message for giving the permission to send media data such as, for example, a granted message or a SIP-based TBCP talk burst granted message. And then, the PoC server 200 starts the permissive timer for sending media data (T2 timer). For instance, the T2 timer can be started, together with the notification regarding the grant of the permission. In this case, information on the T2 timer can be included in the message for giving the permission, and transmitted from the PoC server 200 to the PoC client 100 so that the PoC client 100 can be informed.

Meanwhile, the PoC server 200 notifies one or more other PoC clients participating in the session that the permission to send media data has been occupied (or taken) by the PoC client 100. In this case, such notification can be achieved by transmitting a message indicating that the PoC client 100 has occupied the permission to send media data, such as a taken message or a SIP-based TB taken message, to the other PoC clients in the session.

Step 3: Upon receiving the permission to send media data, the PoC client 100 transmits data. When the PoC server 200 receives the first data from the PoC client 100, the PoC server 200 starts (or initiates) the permissive timer for sending media, namely, the T2 timer.

Step 4: Thereafter, when the T2 timer expires (because its set time has elapsed) while the data is being received from the PoC client 100, the PoC server 200 starts (or initiates) the additionally permissive timer for sending media (T3 timer), and notifies the PoC client 100 that the PoC server 200 withdraws (or revokes) the permission to send media. In this case, such notification can be achieved by transmitting a message for withdrawing the permission to send media such as, for example, a revoke message or a SIP-based TBCP talk burst revoke message. While notifying about the withdrawal (or revocation) of the permission, the PoC server 200 can inform the PoC client 100 about a value (preset time)of the T3 timer and/or a value (preset time) of the T9 timer. For instance, the value of the T3 timer and/or the value of the T9 timer can be informed by being included in the message for withdrawing the permission to send media (e.g., TBCP talk burst revoke message), which is then transmitted from the PoC server 200 to the PoC client 100.

Based on the received time information, the PoC client 100 can determine the value of the T12 timer so that the running time of the T12 timer can be set. For instance, when the PoC client 100 receives the value of the T3 timer (e.g., 3 seconds) and the value of the T9 timer (e.g., 30 seconds) from the PoC server 200, the PoC client 100 can determine and sets the value of the T12 timer to be around 33 seconds (T3 value+T9 value). As a variation, the value of the T12 timer can be set to equal to 'α +value of the T9 timer', where 'α' equals or approximately equals the value of the T3 timer.

Step 5: In response to the withdrawal (or revocation) of the permission to send media, the PoC client 100 starts (or initiates) the non-allowable timer for requesting permission to send media (T12 timer), and transmits the remaining media data. In this case, as mentioned above, the T12 timer can be set based on the values of the T3 timer and the T9 timer (or other time information) that have been received from the PoC server 200. In one example, the value of the T12 timer can be a value obtained by adding a certain time value (e.g., 'α') to the value of the T9 timer. Alternatively, the value of the T12 timer can be a value obtained by adding the value of the T3 timer and the value of the T9 timer. When the T12 timer is initiated/started, the PoC client 100 is limited in that it cannot request a permission to send media until the T12 timer expires. That is, only after the T12 timer expires, the PoC client 100 can request a permission to send media data to the PoC server 200.

Step 6: The PoC server 200 processes data received from the PoC client 100 until the T3 timer expires. When the T3 timer expires, the PoC server 200 starts (or initiates) the non-permissive timer for sending media (T9 timer), and disregards or discards data received from the PoC client 100. Although not shown, the PoC server 200 notifies the other PoC client(s) participating in the session about an idle state of the session. While the T9 timer is running, the other PoC client(s) participating in the session can request a talk burst.

Step 7: When the T9 timer expires, the PoC server 200 notifies the PoC client 100 about the idle state of the session. In this case, this notification about the idle state can be achieved by transmitting an idle state message such as, for example, an idle message or a SIP-based TBCP talk burst idle message.

However, in the related art of FIG. 2, although the PoC client 100 has been notified about the idle state in step 7, the PoC client 100 has to wait for the T12 timer to expire and cannot request a permission to send media to the PoC server 200 until the T12 timer expires. As a result, a valuable session time is wasted.

FIG. 3 is a view illustrating another scenario in a method of controlling a transmission of media data in a PT service according to the related art.

As shown in FIG. 3, in the related art, the PoC client 100 cannot request a permission to send media even when the PoC server 200 has received the final data and a transmission stop message from the PoC client 100 before the T3 timer has expired. This will be described in more detail as follows.

Steps 1~5: The procedure is the same as that shown in FIG. 2.

Step 6: The PoC client 100 transmits the final media data before the T3 timer expires and notifies the PoC server 200 about stopping the transmission. In this case, this notification can be achieved by transmitting a transmission stop message such as a release message or a SIP-based TBCP talk burst release message.

However, although the PoC server 200 receives the final data from the PoC client 100 before the T3 timer expires and is notified about the stopping of the transmission, the PoC server 200 automatically starts the T9 timer, when the T3 timer expires.

Steps 7-8: Then, even if the PoC client 100 were able to request a permission to send media to the PoC server 200, the PoC server 200 does not allow (give or grant) the permission to send media. For instance, when the PoC client 100 sends a TBCP talk burst request to the PoC server 200, the PoC server 200 responds by sending a TBCP talk burst deny message to the PoC client 100.

Step 9: Thereafter, when the T9 timer expires, the PoC server 200 notifies the PoC client 100 about an idle state of the session. As stated above, although the PoC client 100 completes its data transmission before the T3 timer of the PoC server 200 expires, the fact that the PoC server 200 automatically starts (or initiates) the T9 timer so the PoC client 100 cannot be given again a permission to send media until the T9 timer expires, is a too severe restriction on the PoC client 100. In addition, in this state, if the other PoC clients participating in the session do not request a permission to send media, the session will continue in the idle state. Also, although the PoC client 100 completes its transmission of media data before the T2 timer expires, if the media data is delayed due to a problem of a network and reaches the PoC server 200 after the T3 timer is started, the restriction is imposed on the PoC client 100, which would be considered to be too severe.

Therefore, the present invention provides a PT client, a PT system and a method for controlling a transmission of media data in a PT service, which address these limitations and disadvantages associated with the related art.

The exemplary embodiments of the present invention will now be described in detail with reference to FIGS. 4-6. However, the present invention is not limited thereto.

FIG. 4 is a view illustrating a method for controlling a transmission of media data according to a first exemplary embodiment of the present invention.

As shown in FIG. 4, in the method according to the first exemplary embodiment of the present invention, when the PoC client (or PT client) 100 completes data transmission before the additionally permissive timer for sending media (the second limit time) (T3 timer) expires and notifies the PoC server (or PT server) 200 about a transmission stop, preferably it is operated as follows.

First, the PoC server 200 stops the T3 timer (instead of running the T3 timer until it expires on its own) when a media burst release message and last media data have been received. Second, the PoC server 200 notifies the PoC client 100 and the other PoC client(s) participating in the session about an idle state of the session so that they may request a permission to send media. Third, the PoC client 100 stops the T12 timer when the PoC client 100 has been notified about the idle state.

The second exemplary embodiment of the present invention will now be described in more detail referring to FIG. 4.

Steps 1~5: The procedure is the same as that shown in FIGS. 2 and 3.

Step 6: The PoC client 100 transmits the final (remaining or last) media data before the T3 timer expires and notifies the PoC server 200 about the stopping of the data transmission. Here, the order in which the PoC server 200 receives the last media data and the notification about the stopping of the transmission can vary. For instance, the PoC server 200 can receive the last media data before or after the notification about the stopping of the transmission. In this case, the notification about the stopping of the transmission can be achieved by transmitting a transmission stop message such as a release message or a SIP-based TBCP Talk Burst Release message from the PoC client 100 to the PoC server 200.

Step 7: Once the PoC server 200 receives both the transmission stop message (e.g., TBCP Talk Burst Release message) and the last media data from the PoC client 100, the PoC server 200 stops the T3 timer and notifies the PoC client 100 and the other PoC client(s) participating in the session that the session is in an idle state. In this case, this notification can be achieved by transmitting an idle state message such as an Idle message or a SIP-based TBCP Talk Burst Idle message from the PoC server 200 to the PoC client 100 and other PoC client(s) in the session. When any other PoC client participating in the session receives the idle message from the PoC server 200, that PoC client can request a permission to send media to the PoC server 200. As a result, a value session time is not wasted.

Step 8: When the PoC client 100 receives the idle message such as a TBCP Talk Burst Idle message from the PoC server 200, then the PoC client 100 stops the T12 timer. As a result, if there is media data to be transmitted, the PoC client 100 can now requests a permission to send media, e.g., by transmitting a TBCP Talk Burst Request message to the PoC server 200. As a result, a valuable session time is not wasted.

Step 9: The PoC server 200 can now grant a permission to send media to a requesting PoC client, which can be the PoC client 100 or other PoC client in the session. In this example, the PoC server 200 notifies the PoC client 100 that the permission to send media is given (or granted) to the PoC client 100. This notification can be implemented by transmitting a message such as a TBCP Talk Burst Granted message from the PoC server 200 to the PoC client 100.

As stated above, in the first exemplary embodiment of the present invention, when the PoC client 100 completes the data transmission and stops the data transmission before the T3 timer expires, the PoC client 100 is allowed to request a permission to send media again without having to wait for the expiration of the 3 and/or T12 timer, whereby the balancing with respect to the restriction imposed on the PoC client 100 can be advantageously made and the session time is not wasted.

If the PoC client 100 keeps transmitting data even after the T3 timer has expired, the PoC server 200 disregards or discards the received data and prevents the PoC client 100 from requesting a permission to send media until after the 9 timer expires. In this manner, the PoC server 200 restricts the PoC client 100 in data transmission in a reasonable degree and provides suitable priority to the other PoC clients participating in the session.

FIG. 5 is a view illustrating a method for controlling a transmission of media data according to a second exemplary embodiment of the present invention.

As shown in FIG. 5, in the method according to the second exemplary embodiment of the present invention, when the PoC client (or PT client) 100 completes the transmission of the data and notifies the PoC server (or PT server) 200 about the stopping of the data transmission before the additionally permissive timer for sending media (the second limit time) (T3 timer) expires, preferably it is operated as follows.

First, in the second embodiment the PoC server 200 does not stop the T3 timer when both the talk burst release message and the last media data are received from the PoC client 100, but allows the T3 timer to run to its expiration. When the T3 timer expires, the PoC server 200 does not start the T9 timer although the T3 timer has expired. Second, the PoC server 200 notifies the other PoC client(s) participating in the session, except for the PoC client 100, that the session is in an idle state in response to the stopping of the data transmission by the PoC client 100. Third, only when the PoC server 200 does not receive a request for permission to send media from the other PoC client(s) participating in the session before the T3 timer expires or when the T3 timer expires, the PoC server 200 notifies the PoC client 100 that the session is in the idle state. Fourth, the PoC client 100 stops the T12 timer upon being notified about the idle state.

The second exemplary embodiment of the present invention will now be described in more detail referring to FIG. 5.

Steps 1~5: The procedure is the same as that shown in FIGS. 2, 3 and 4.

Step 6: The PoC client 100 transmits the final media data before the T3 timer expires and informs the PoC server 200 about its transmission stop, e.g., by transmitting a TBCP Talk Burst Release message to the PoC server 200.

Then, the PoC server 200 informs all the other PoC client (s) participating in the session, except for the PoC client 100, about the idle state. In other words, only the other PoC clients, except for the PoC client 100, can request a permission to send media as long as the T3 timer has not expired.

Step 7: Only when there is no request for permission to send media from the other PoC clients participating in the session before the T3 timer has expired, the PoC server 200 notifies the PoC client 100 that the session is in the idle state when the T3 timer expires. When the PoC client 100 is notified about the idle state (e.g., via a TBCP Talk Burst Idle message), the PoC client 100 stops the T12 timer. If, however, there is a request for permission to send media from one of the other PoC clients (not the PoC client 100) participating in the session before the T3 timer expires, the PoC server 200 can give a permission to send media to the requesting one of the other PoC clients. And then, the PoC server 200 stops the T3 timer and transmits a message indicating that the one of the other PoC clients has occupied the permission to send media (e.g., the TBCP Talk Burst Taken message), to the PoC client 100.

Steps 8~9: The PoC client 100 may request a permission to send media from the PoC server 200 in response to the idle state of the session, and such permission can be given to the PoC client 100 if available.

As mentioned above, in the second exemplary embodiment of the present invention, because the PoC server 200 allows the other PoC clients participating in the session, except for the PoC client 100, to request a permission to send media until the T3 timer expires, the other PoC clients can be given suitable priority for requesting a permission to send media while the PoC client 100 can be properly limited, advantageously. In addition, if there is no request for permission to send media from the other PoC clients participating in the session before the T3 timer expires (i.e., while the T3 timer is running), the PoC client 100 can request a permission to send media once the T3 timer expires, so the PoC client 100 does not need to wait for the running and expiration of the T9 timer.

The methods described so far according to the present invention can be implemented by software, hardware or their combination. For example, the PT service method can be a program that can be stored in a storage medium (e.g., an internal memory of a mobile terminal, a flash memory, a hard disk, etc.). The program stored in the storage medium can be executed by a computer or a processor (e.g., an internal microprocessor of the mobile terminal).

Figure 6:
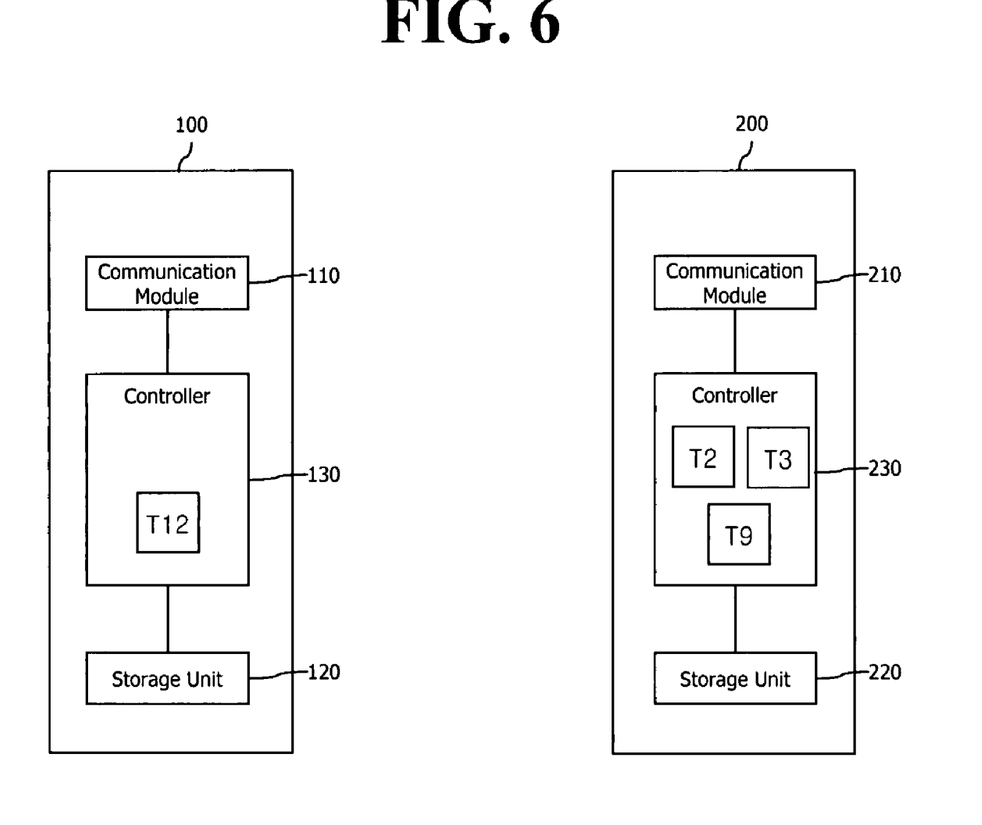
FIG. 6 is a view illustrating a PoC client and a PoC server in which the method(s) of the present invention can be implemented according to an embodiment of the present invention.

FIG. 6 is a view illustrating a PoC client and a PoC server according to the exemplary embodiment of the present invention. The methods of the present invention can be implemented in the PoC client and PoC server of FIG. 6 or in other suitable devices/systems.

As shown in FIG. 6, in the present invention, the PoC client (or PT client) 100 may include basic hardware, namely, a communication module 110, a storage unit 120 and a controller 130, for requesting a permission to send media and transmitting media data. The PoC client 100 can include other known components, and all components of the PoC/PT client 100 are operatively coupled and configured.

The communication module 110 may transmit a message for requesting a permission to send media and receive a message for indicating that the permission to send media is given (or granted), or receive a message for rejecting the permission to send media or a message for withdrawing (or revoking) the permission to send media. The communication module 110 may transmit/receive media data or transmit a transmission stop message. Also, the communication module 110 may receive an idle state message.

The storage unit 120 may temporarily store the transmitted/received media data and store any time information contained in a media burst revoke message such as a TBCP Talk Burst Revoke message from the PoC server 200. For instance, the storage unit 120 can store the value of the T3 timer and/or the value of the T9 timer received as described above, or the value of the T12 timer.

The controller 130 may control the communication module 110 and the storage unit 120 along with any other components of the PoC client 100. The controller 130 may calculate the value of the T12 timer based on the value of the 3 timer and/or the value of the T9 timer, and start or stop the T12 timer according to the present invention. The T12 timer can reside in the controller 130 as shown or in another component, or can be a separate entity.

As shown, the PoC server (or PT server) 200 may include the basic hardware, namely, a communication module 210, a storage unit 220 and a controller 230, for giving a permission to send media and receiving and processing media data. The PoC server 200 can include other known components, and all components of the PoC server 200 are operatively coupled and configured.

The communication module 210 may receive the message for requesting permission to send media, and transmit a message indicating that the permission to send media is given (or granted) to the PoC client, a message for rejecting the permission to send media or a message for withdrawing (revoking) the permission to send media. The communication module 210 may receive media data and transfer the received media data to the other PoC client(s) participating in the session. In addition, the communication module 210 may receive a transmission stop message, or transmit an idle state message.

The storage unit 220 may temporarily store the transmitted/received media data, and store the values of the T2 timer, the T3 timer and the T9 timer as stated above.

The controller 230 may control the communication module 210 and the storage unit 220 to transmit and receive the afore-mentioned various messages, and receive and process media data. The controller 230 may start the T2 timer, the T3 timer and the T9 timer and can stop the T3 timer as discussed above. The T2, T3 and T9 timers can reside in the controller 230 as shown or in another component, or can be separate entities.

The construction and operation of the PoC client 100 and the PoC server 200 including the technical characteristics according to the present invention have been described, and besides, any elements required for the PT service method will be obvious to an ordinary person in the art, so its description will be omitted.

As so far described, the method for requesting a permission to send media and the method for controlling a PT service according to the present invention have many advantages.

For instance, when the PoC client completes the data transmission and notifies the PoC server 200 about its data transmission stop before the additionally permissive timer to send media is terminated, the PoC client can request a permission to send afterwards, thereby increasing the balancing characteristics in the restriction imposed on the PoC client.

In addition, the PoC server 200 can allow only the other PoC clients participating in the session, except for the PoC client 100, to request a permission to send until the additionally permissive timer to send media expires. As a result, the other PoC clients can be properly given priority while the PoC client 100 can be properly limited when requesting a permission to send media burst.

As the present invention may be embodied in multiple forms without departing from the spirit or essential characteristics thereof, it should be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are intended to be embraced by the appended claims.

The invention claimed is:

1. A method for controlling transmission of media data, comprising:
    initiating a session-based PT (Push-To) service between a PT client and a PT server that has established a PT session using Session Initiation Protocol (SIP) techniques;
    starting, by the PT client, a timer when a media burst revoke message including time information is received from the PT server,
    where the timer is a client-operated retry-after timer that operates during which the PT client cannot request a permission to send media data to the PT server, and
    wherein the time information is a value of a server-operated retry-after timer;
    receiving, by the PT client, a media burst idle message from the PT server after the client-operated retry-after timer is started,
    wherein the media burst idle message is received from the PT server that has started a stop talking grace timer and that has received last media data and a media burst release message from the PT client before expiry of the stop talking grace timer; and
    stopping, by the PT client, the client-operated retry-after timer before the client-operated retry-after timer expires, when the media burst idle message is received from the PT server, such that the PT client can request a permission to send media data to the PT server.

2. The method of claim 1, wherein a value of the client-operated retry-after timer is set based on the time information included in the media burst revoke message.

3. The method of claim 2, wherein the server-operated retry-after timer is a T9 timer.

4. The method of claim 1, further comprising:
    transmitting, by the PT client, last media data and the media burst release message to the PT server,
    wherein the transmitting step is performed after the client-operated retry-after timer is started but before the client-operated retry-after timer is stopped.

5. The method of claim 1, further comprising;
    transmitting, by the PT client, a media burst request message to the PT server, after the client-operated retry-after timer is stopped.

6. The method of claim 1, wherein the client-operated retry-after timer is a T12 timer.

7. A PT (Push-To) client device comprising:
    a communication module to perform transmission and reception of signals and information;
    at least one timer to perform timer operations; and
    a controller that cooperates with a PT server in order to, initiate a session-based PT (Push-To) service between the PT client device and the PT server that has established a PT session using Session Initiation Protocol (SIP) techniques;
    start the timer when a media burst revoke message including time information is received from the PT server, wherein the timer is a client-operated retry-after timer that operates during which the PT client device cannot request a permission to send media data to the PT server, and wherein the time information is a value of a server-operated retry-after timer;
    receive a media burst idle message from the PT server after the client-operated retry-after timer is started, wherein the media burst idle message is received from the PT server that has started a stop talking grace timer and that has received last media data and a media burst release message from the PT client device before expiry of the stop talking grace timer; and
    stop the client-operated retry-after timer before the client-operated retry-after timer expires, when the media burst idle message is received from the PT server, such that the PT client device can request a permission to send media data to the PT server.

8. The PT client device of claim 7, wherein the client-operated retry-after timer is a T12 timer.

9. The PT client device of claim 7, wherein the controller is able to send a media burst request message to the PT server after the client-operated retry-after timer is stopped.

10. The PT client device of claim 7, wherein the PT client device is a PoC (Push-to-talk over Cellular) client device.

11. The PT client device of claim 7, wherein the server-operated retry-after timer is a T9 timer.

12. A talk burst control method for a session-based PT (Push-To) service between a PT client and a PT server, the method comprising:
   transmitting, by the PT client, a TBCP Talk Burst Request message for getting a permission to send a Media Burst to the PT server;
   receiving, by the PT client, a TBCP Talk Burst Granted message in response to the TBCP Talk Burst Request message from the PT server;
   transmitting, by the PT client, media data to the PT server, wherein the media data is transmitted through a session between the PT client and the PT server;
   receiving, by the PT client, a TBCP Talk Burst Revoke message including time information from the PT server;
   starting, by the PT client, a timer when the TBCP Talk Burst Revoke message including the time information is received from the PT Server,
   wherein the timer is a client-operated retry-after timer during which the PT client cannot request a permission to send media data to the PT server, and wherein the time information is a value of a server-operated retry-after timer; and
   transmitting, by the PT client, last media data and a media burst release message to the PT server, wherein said transmitting step is performed after the client-operated retry-after timer is started but before the client-operated retry-after timer is stopped; and
   stopping, by the PT client, the client-operated retry-after timer before the client-operated retry-after timer expires, when a TBCP Talk Burst idle message is received from the PT server, such that the PT client can request a permission to send media data to the PT server.

13. The method of claim 12, wherein a value of the client-operated retry-after timer depends on the time information included in the TBCP Talk Burst Revoke message.

14. The method of claim 12, wherein the server-operated retry-after timer is a T9 timer.

15. The method of claim 12, further comprising:
   transmitting, by the PT client, a media burst request message to the PT server, after the client-operated retry-after timer is stopped.

16. The method of claim 12, wherein the client-operated timer is a T12 timer.

* * * * *